July 1, 1924.
C. HAMMER
GLASS CONTAINER
Filed Nov. 29, 1922
1,499,612
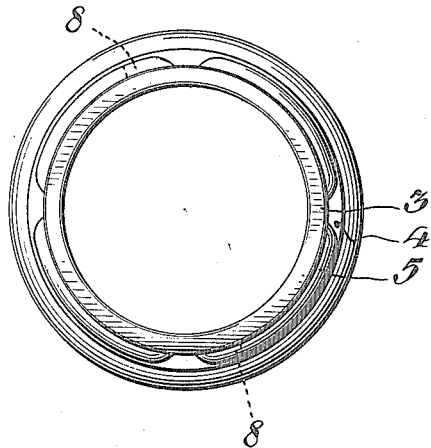
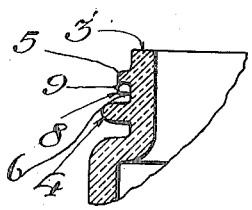
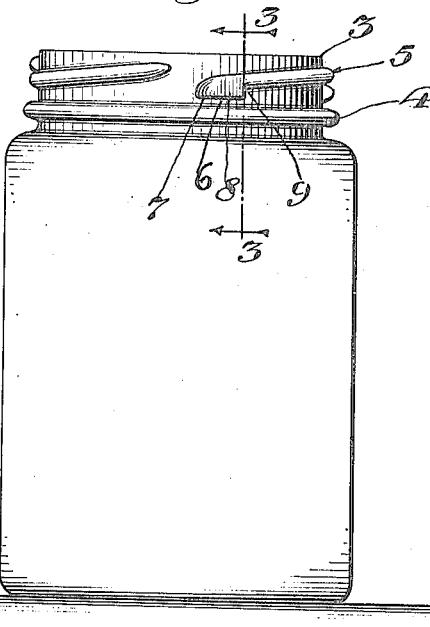
Inventor
Charles Hammer
by his Attorneys,
Reed & Gray Patented July 1, 1924.

1,499,612

UNITED STATES PATENT OFFICE.

CHARLES HAMMER, OF HOLLIS COURT BOULEVARD, NEW YORK.

GLASS CONTAINER.

Application filed November 29, 1922. Serial No. 603,989.

*To all whom it may concern:*

Be it known that I, CHARLES HAMMER, a citizen of the United States, residing at Hollis Court Boulevard, in the county of Queens and State of New York, have invented certain new and useful Improvements in Glass Containers, of which the following is a specification.

This invention relates to glass containers, particularly to those adapted for use with metal caps or closures, the improvement having to do particularly with the threaded portion of such containers, the object of the invention being to provide an improved locking projection or thread on the glass container, so constructed as to facilitate the removal of the threaded neck of the glass container intact from the glass mold, and which will also act to prevent the cap from being turned too far onto the jar and thus forced out of shape to prevent reuse on the jar.

In the manufacture of glass containers, such for instance as jars, they are made by the use of openable molds, usually comprising two similarly formed halves, and it has been found that when the mold is opened to release the container, there is a tendency of the lower or rear ends of the threads to bind the mold at the joints of the mold where the two halves of the mold come together. In other words as the mold sections are opened in a straight parallel line, while the threads on the glass container are inclined on their top and bottom in the direction of their length, it follows that the opening of the molds in a straight line causes the inclined thread to stick in said mold, or in other words to interfere and tear the thread away from the glass jar. That is to say, by reason of the fact that the glass thread extends down toward the usual shoulder on the glass container comparatively close thereto, when the mold opens, the thread of the mold, which is between the glass thread and the glass shoulder, sticks in that end resulting in the breakage or tearing of the thread at this point, because it must be remembered that at the time the mold is opened to release the glass container therefrom, the container is in a highly heated condition, in fact in a somewhat plastic condition, not having as yet sufficiently cooled and at this time is easily injured. As the two halves of the mold for making the glass container, and therefore the two halves of the neck ring, swing in a plane perpendicular to the axis of the mold and the container therein, consequently those parts of the neck rings at the parting or parting points thereof drag along the underside of the thread and bind, resulting in mutilation, tearing or destroying the underside of the thread, and form what is known as a check or break. But by means of the filling projection hereinafter referred to formed by the mold during the molding of the container this is prevented. The neck rings of the two halves of the mold are so formed that when the glass is molded therein the downwardly inclined threads or projections will have a configuration at the under surface at or near the parting of the mold parts that will prevent a binding action between the thread and mold when the latter is opened. However I have discovered that by providing the lower or inner end of the glass projection or thread located adjacent to the joints of the mold, with a certain configuration shown herein in the form of a projection having the lower or under face thereof substantially straight or parallel with the upper edge or wall of the shoulder, although not necessarily spaced therefrom that this enables the mold when it is opened in a straight line to free the glass jar without breakage of the thread, while at the same time this projection forms an abutment which will limit the turning-on movement of the cap and thus prevent it from being distorted and enable it to be reused. Therefore the present improvement has to do with the provision of means formed in connection with the threads of a glass jar which will facilitate the removal of the jar from the mold and which will also act to prevent the distortion of the cap thereby permitting the reuse of the same and to the method of making such containers.

In the drawings accompanying and forming a part of this specification Fig. 1 is a side view of the top of a glass container showing the present improvement; Fig. 2 is a top view thereof; and Fig. 3 is a sectional view taken on line 3—3 of Fig. 2. Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The glass container of any suitable form having the usual mouth or neck portion 3 and downwardly inclined shoulder 4 and locking projections or threads 5, shown herein as of the divided variety, is provided adjacent to the inner or lower ends of two diametrically opposite threads with filling projections 8, each of which in the present instance is formed as a part of the lower or inner end of the thread, this projection having its lower edge 7 straight or substantially parallel with the shoulder 4. In the drawing it is shown spaced from the shoulder as at 6, but this is not essential in all sizes of containers. In the present instance these projections 8 are carried by that pair of threads, four of which are shown in the present instance, which have their inner, rear or lower ends adjacent to the joints in the mold, and therefore adjacent to the jointed or seamed portions of the glass container. Thus when the mold is opened in a straight line these relatively straight portions on the glass container prevent the glass threads from becoming mutilated while at the same time the forward edge 9 of each of these projections acts as an abutment or stop to prevent the cap from being turned too far onto the jar, so that they thus limit the turning movement of the cap.

Another of the advantages resulting from the present improvement is that it prevents the burning out of the neck rings of the mold. In the ordinary divided thread jar where the thread is close to the shoulder there is very little space between the under side of the thread and the top of the glass shoulder, and this space is formed by a part of what is known as the neck ring of the mold. In other words this neck ring of the metal mold must have a part of a size to fit in the space between the shoulder and the thread and consequently at the lower inclined edge of the thread this portion of the neck ring is very thin in order to fit this space, and as the glass is molded at the tremendous heat of approximately 2000° F. these thin portions of the neck rings quickly burn out. By reason of the present improvement however, it will be seen that there is a greater amount of metal present at this part of the neck ring of the mold and consequently the effect of the heat is very much lessened, and the life of the neck ring is lengthened. In other words by reason of the part 7 a thick wall is formed on the neck ring of the mold which is not as quickly burned out.

By the term "filling projection" as used herein is meant a projection that fills in or substantially fills in the space between the shoulder and the lower or inner end of an inclined thread to such an extent that it prevents the tearing of the highly heated glass thread at this point on the opening of the mold.

It is to be understood that by describing in detail herein any particular form, structure or arrangement, it is not intended to limit the invention beyond the terms of the several claims or the requirements of the prior art.

Having thus explained the nature of my new invention and described a way of constructing and using the same, although without attempting to set forth all of the forms in which it may be made, or all of the modes of its use, I claim:

1. A glass container made from the use of a mold, the parts of which swing in a plane perpendicular to the axis of the container, and having a projection inclined downwardly from the top of the container, the configuration of the under surface of the projection at or near the parting of the mold parts being such as to prevent binding action between the said projection and mold when the latter is opened.

2. A glass container made from the use of a mold, the parts of which swing in a plane perpendicular to the axis of the container, and having a projection or thread inclined downwardly from the top of the container, the configuration of the under surface of the thread at or near the parting of the mold parts being such as to prevent binding action between the said thread and mold when the latter is opened and also such as to limit the turning movement of a cap on the container.

3. A glass container made from the use of a mold, the parts of which swing in a plane perpendicular to the axis of the container, and having a projection or thread inclined downwardly from the top of the container, said thread having at its lower end a projection, the configuration of which at or near the parting of the mold parts being such as to prevent binding action between the said thread and mold when the latter is opened.

4. A glass container made from the use of a mold, the parts of which swing in a plane perpendicular to the axis of the container, and having a projection or thread inclined downwardly from the top of the container, said thread having at its lower end a projection, the configuration of which at or near the parting of the mold parts being such as to prevent binding action between the said thread and mold when the latter is opened, and the said projection having a forward face effective to limit the turning movement of a cap on the container.

5. A glass container made from the use of a mold, the parts of which swing in a plane perpendicular to the axis of the container, and having a shoulder and a projection or thread inclined downwardly from the top of the container, the configuration of the under surface of the thread at or near the parting of the mold parts being such as to prevent binding action between the said thread and mold when the latter is opened.

6. A glass container made from the use of a mold, the parts of which swing in a plane perpendicular to the axis of the container, and having a shoulder and a projection or thread inclined downwardly from the top of the container, said thread having adjacent to its lower end a substantially filling projection, the configuration of which at or near the parting of the mold parts is such as to prevent binding action between the said thread and mold when the latter is opened.

7. A glass container made from the use of a mold, the parts of which swing in a plane perpendicular to the axis of the container, and having a shoulder and a projection or thread inclined downwardly from the top of the container, said thread having adjacent to its lower end a substantially filling projection, the configuration of which at or near the parting of the mold parts is such as to prevent binding action between the said thread and mold when the latter is opened, and said filling projection having a forward face effective to limit the turning movement of a cap on the container.

8. A glass container made from the use of a mold, the parts of which swing in a plane perpendicular to the axis of the container, and having a shoulder and a projection or thread inclined downwardly from the top of the container, said thread having adjacent to its lower end a substantially filling projection, the configuration of which at or near the parting of the mold parts is such as to prevent binding action between the said thread and mold when the latter is opened, said filling projection being spaced from the shoulder.

9. A glass container made from the use of a mold, the parts of which swing in a plane perpendicular to the axis of the container, and having a shoulder and a projection or thread inclined downwardly from the top of the container, said thread having adjacent to its lower end a substantially filling projection, the configuration of which at or near the parting of the mold parts is such as to prevent binding action between the said thread and mold when the latter is opened, said filling projection being spaced from the shoulder, and having a forward face effective to limit the turning movement of a cap on the container.

10. A glass container made from the use of a mold, the parts of which swing in a plane perpendicular to the axis of the container, and having a shoulder and a projection or thread inclined downwardly from the top of the container, said thread having adjacent to its lower end a substantially filling projection, the configuration of which at or near the parting of the mold parts is such as to prevent binding action between the said thread and mold when the latter is opened, the under surface of said filling projection substantially conforming to the shape of the upper edge of the shoulder.

11. A glass container made from the use of a mold, the parts of which swing in a plane perpendicular to the axis of the container, and having a pair of diametrically opposite projections or threads, each inclined downwardly from the top of the container, the configuration of the under surface of each thread at or near the parting of the mold parts being such as to prevent binding action between the said threads and mold when the latter is opened.

12. A glass container made from the use of a mold, the parts of which swing in a plane perpendicular to the axis of the container, and having a shoulder and diametrically opposite projections or threads, each inclined downwardly from the top of the container, each of said threads having adjacent to its lower end a projection, the configuration of which at or near the parting of the mold parts is such as to prevent binding action between the said threads and mold when the latter is opened.

13. A glass container made from the use of a mold, the parts of which swing in a plane perpendicular to the axis of the container, and having a shoulder and diametrically opposite projections or threads, each inclined downwardly from the top of the container, each of said threads having adjacent to its lower end a projection, the configuration of which at or near the parting of the mold parts is such as to prevent binding action between the said threads and mold when the latter is opened, each of said last projections having a forward face effective to limit the turning movement of a cap on the container.

14. The method of making a glass container, which consists in forming a mold having its parts swinging in a plan perpendicular to the axis of the container and formed to provide on a glass container a shoulder, a projection or thread inclined downwardly from the top of the container, and a substantially filling projection formed adjacent to the lower end of the thread so that the configuration of the under surface of the thread at or near the parting of the mold parts is such as to prevent binding action between the said thread and mold when the latter is opened.

15. A molded and jointed or seamed glass container having a shoulder and a pair of downwardly inclined locking projections or threads each terminating spaced from the shoulder, said threads having the lower inner ends thereof located adjacent to the seamed portions of the container and having means constructed to facilitate the removal of the container from the mold.

16. A molded and jointed or seamed glass container having a shoulder and a pair of downwardly inclined locking projections or threads each terminating spaced from the shoulder, said threads having the lower inner ends thereof located adjacent to the seamed portions of the container and having means constructed to facilitate the removal of the container from the mold, said means comprising a filling portion between the inner end of the thread and the shoulder with its lower portion in the direction of its length conforming to the shape of the upper edge of the shoulder.

Signed at 1822 Park Row Bldg., New York city, this 27th day of November 1922.

CHARLES HAMMER.